March 12, 1968     W. A. HUBER     3,373,403
REDUNDANT ENCODED MONOCYCLE SYSTEM
Filed Aug. 26, 1963     7 Sheets-Sheet 1

FIG. 1

INVENTOR,
WILLIAM A. HUBER
BY Edward Kelly

ATTORNEY.

March 12, 1968

W. A. HUBER

3,373,403

REDUNDANT ENCODED MONOCYCLE SYSTEM

Filed Aug. 26, 1963

INVENTOR,
WILLIAM A. HUBER

BY *Edward Kelly*

ATTORNEY.

March 12, 1968   W. A. HUBER   3,373,403
REDUNDANT ENCODED MONOCYCLE SYSTEM
Filed Aug. 26, 1963   7 Sheets-Sheet 3

INVENTOR,
WILLIAM A. HUBER
BY
ATTORNEY.

FIG. 8B

INVENTOR,
WILLIAM A. HUBER
ATTORNEY.

March 12, 1968  W. A. HUBER  3,373,403
REDUNDANT ENCODED MONOCYCLE SYSTEM
Filed Aug. 26, 1963  7 Sheets-Sheet 6

INVENTOR,
WILLIAM A. HUBER
BY Edward Shelly
ATTORNEY.

United States Patent Office 3,373,403
Patented Mar. 12, 1968

3,373,403
REDUNDANT ENCODED MONOCYCLE SYSTEM
William A. Huber, 216 Monroe Ave.,
Spring Lake, N.J. 07762
Filed Aug. 26, 1963, Ser. No. 304,699
The portion of the term of the patent subsequent to
Sept. 28, 1982, has been disclaimed
13 Claims. (Cl. 340—146.1)

ABSTRACT OF THE DISCLOSURE

The present invention relates to a coded digital communication system which includes means for predicting in advance from one "mark" signal position to the next "mark" signal position whether or not a "mark" signal should appear. During transmission the sequence of binary signals to be received is converted to the same sequence of minus-cosine wave signals which are time-spaced such that when the minus-cosine wave signals are decoded, the presence or absence of a "mark" signal within a prescribed time period may be predicted.

---

The invention described herein may be manufactured and used by or for the Government for governmnetal purposes without the payment of any royalty thereon.

This invention relates to digital communication systems and more particularly to an improved system and method for detecting and correcting errors in coded digital systems.

Information in the binary digital language is conveyed by use of established codes. For any given code the number of timing periods used to form the character is constant. Inasmuch as only one bit of information can be transmitted during each timing period as a "1" (mark) or "0" (space), these marks and spaces are frequently referred to as bits. For example, the Fieldata code requires eight bits per character (six information bits, one control bit, and one parity bit) and is referred to as an eight bit code. The amount, rate, and accuracy of information that can be conveyed by a binary digital system is related to the code structure which consists of all possible combinations of marks and spaces within the assigned code time interval. A new system for increasing the coding density is known as Monocycle Position Modulation, hereinafter called MPM, which is described in my co-pending application Ser. No. 150,601 entitled "Monocycle Position Modulation System." This co-pending application matured into Patent No. 3,209,259 on Sept. 28, 1965.

The increased use of binary digital techniques for the electrical transmission of alphanumerical data over communication channels requires that procedures be established to reduce the errors normally encountered in this type of service. This is especially true in applications involving the transmission of numerical data. Heretofore, the technique of information redundancy has been utilized to inherently reduce the errors in binary digital communication systems. However, this is normally accomplished at the expense of additional time and/or bandwidth such as the use of parity bit, feedback channel, repetition, etc. The use of the parity bit and various coding schemes for reducing and correcting errors usually requires increased bandwidth for transmission if the information signaling rate is to remain constant.

It is therefore an object of the present invention to provide an improved error detection and correction system applicable to binary digital data that does not require additional time to transmit and, in its minimal bandwidth structure, does not require more channel space than is normally utilized for non-error detection systems.

It is another object of the present invention to provide an improved error detection and correction system utilizing MPM techniques.

It is still another object of the invention to provide a binary coding system wherein information is encoded in the "1" or mark bit to specify or predict when the next mark bit will occur.

It is still another object of the present invention to provide a binary coding system wherein the error correction technique is accomplished by utilizing some of the time interval normally reserved for the transmission of space signals to transmit additional information.

For a better understanding of the invention, together with other and further objects thereof, reference is had to the following description taken in connection with the accompanying drawings in which.

Figure 1:
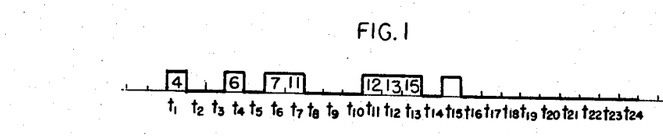
FIG. 1 is a curve to graphically illustrate the prediction routine of the invention.

The present invention embodies a system, hereinafter referred to as the Redundant Encoded Monocycle (REM) system, which predicts in advance from one mark signal position to the next mark signal position. That is, during the transmission of a given mark signal in a specified channel there will also be encoded information that can be utilized to predict if and when the next mark signal will occur. To illustrate the signal prediction technique, the single binary digital channel shown in FIG. 1 will be considered. Although the time base intervals are numbered on the diagram of FIG. 1, it is to be understood that no such identification numbering is transmitted. If we consider time interval $t_1$, it is proposed to encode with the mark signal present at this interval with additional data to indicate that the next mark signal should occur during time interval $t_4$. Any extraneous signals that might occur during time intervals $t_2$ and $t_3$ would therefore be rejected. Thus, a signal that appeared at time interval $t_4$ would be verified from the previous data transmitted during time interval $t_1$. During time interval $t_4$ additional coded information would be contained within the conventional signal to indicate that the next mark signal would occur during time interval $t_6$. Likewise, during time interval $t_6$ a mark signal would be predicted for time interval $t_7$; during time interval $t_7$ a mark signal would be predicted for time interval $t_{11}$, etc. It should be noted that during time interval $t_{15}$, the next mark position is not predicted. This indicates that no mark signal should appear within the next eight time intervals. It is possible, of course, to predict beyond eight signal spaces by adopting a special code such as transmitting an eight prediction code but periodically transmitting it every seven signal spaces. The prediction technique is accomplished by delaying the start of the mark signal from its usual synchronous position in accordance with a code that increases this time delay in proportion to the number of spaces occurring before the next mark signal appears.

If the mark signal does not appear at the receiver in the predetermined position, it can be inserted locally thereby providing the error correction feature. The same error correction technique can be applied if a mark signal appears in an unpredicted position, i.e., it can be ignored. The proposed error detection and correction technique is accomplished by a judicious superimposition of a resultant orthogonal encoded signal and the standard binary digital signal. In the minimal bandwidth configuration, this composite signal degenerates to a —cosine function. The encoding is accomplished in such a manner that the binary nature of the signal is retained and can be utilized as such by facilities normally used for this purpose. At the receiver, not only is the conventional binary digital information extracted from the signal, but through appropriate decoding, additional information is obtained that alerts the receiver when to look for the next mark signal. If this signal is not received when predicted, it can be reestablished locally at the receiver or this condition can activate a feedback channel and ask for a code repeat.

Figure 2:
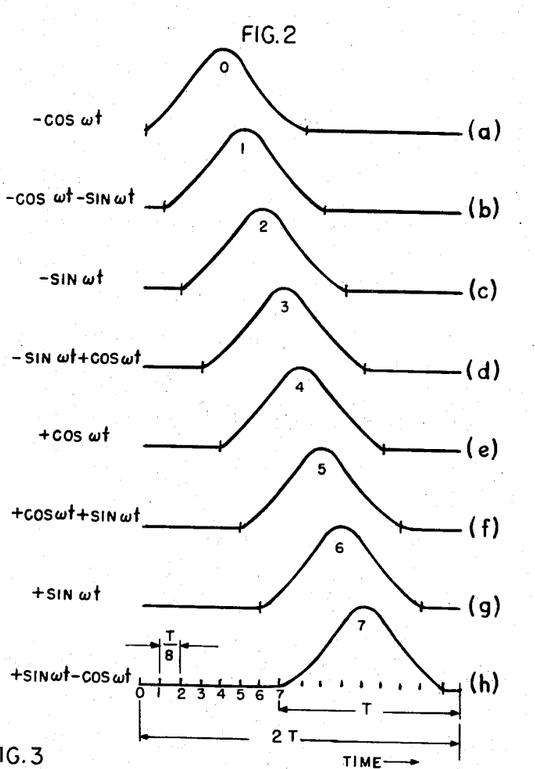
FIG. 2 is a graphical illustration of the —cosine waveform encoding signals.
Figure 3:
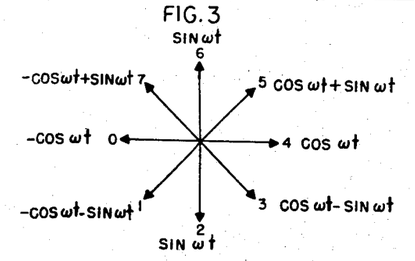
FIG. 3 is a vector diagram to explain the waveforms shown in FIG. 2.
Figure 7:
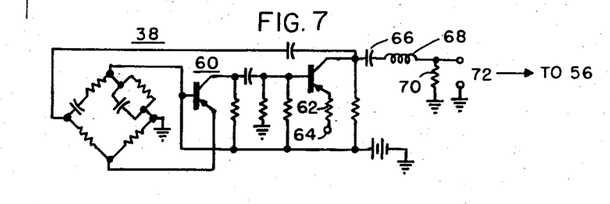
FIG. 7 is a detailed circuit diagram of the —cosine generator shown in FIG. 4.

Referring now to FIG. 2 of the drawings, there is shown a single cycle of each of eight —cosine waveforms having a period or duration time T. As hereinafter explained, the formation of the encoded error detection correction signal is accomplished by utilizing signal cycles selected from the —cosine waveforms. Each of these eight different —cosine waveforms is time-quantized to one of eight distinct positions within a basic timing period 2T, these positions being fixed at successive intervals of ⅛ T. As will hereinafter be explained, each successive position illustrated in FIG. 2 differs by 45°. These different positions are equivalent to phase modulation of a —cosine signal on an individual cycle basis as will be more readily understood by referring to the vector diagram of FIG. 3. The vectors shown in FIG. 3 are stationary and represent the phase angular relationship between the orthogonal signals ±cos $\omega t$ and ±sin $\omega t$ and their sums. This results in the generation of eight separate signals which are represented by the eight vectors, numbered 0–7, shown in FIG. 3 and which are correspondingly numbered in FIG. 2. The radian frequency $\omega = 2\pi f$ is the same for all the signals. These eight signals may be derived from a single continuous —cosine waveform through the use of fixed delays of different lengths or they may be generated by gating a (1 —cosine) generator ON for a single cycle coincident with any one of the ⅛ T time intervals mentioned above. The latter method is preferred and will be discussed in detail in conjunction with FIG. 7. For minimum bandwidth requirements the encoded —cosine waveform frequency $f$ is chosen so that $$f = \frac{1}{T_m}$$

where $T_m = T =$ the duration of the mark period.

In order to develop an encoded signal stream, one cycle for each mark signal is selected from one of the eight signals represented by the vectors of FIG. 3 and illustrated as waveforms in FIG. 2. The selected signal is gated into the output signal stream such that one of the signals shown in FIG. 2 is transmitted in place of the conventional mark signal. Regardless of which of the two methods is used, the particular signal selected is always gated for just one cycle and the start and finish of the cycle is always coincident with successive negative peaks of the wave which are assumed to be at ground potential. The gated wave is therefore referred to as a —cosine bit and the eight signals shown in FIG. 2 can be considered as —cosine bits with an associated time delay.

Figure 4:
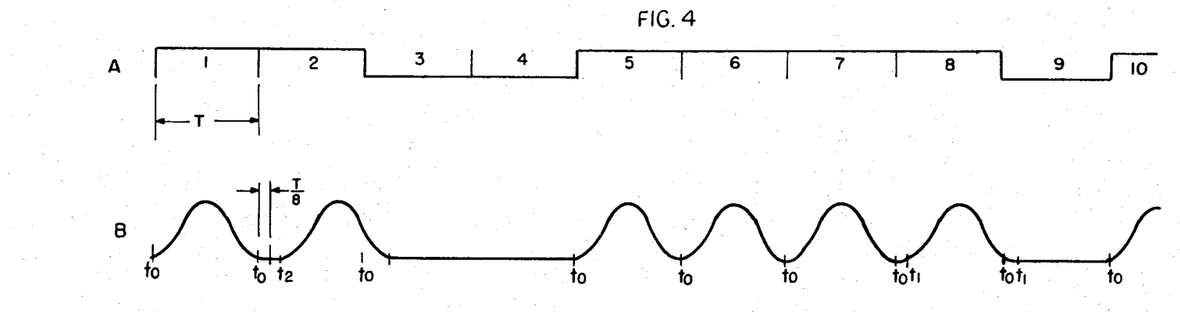
FIG. 4 illustrates graphically the relationship between the binary signal bits and its equivalent encoded —cosine waveform bits.

The relationship between a binary pulse train and its related encoded —cosine bit pulse train is shown in FIG. 4. In this binary pulse train, the presence of a pulse indicates a mark or a "1" and the absence of a pulse indicates a space or a "0." Curve A of FIG. 4 shows a typical waveform of a binary pulse train which might occur in any digital system such as a Teletype system, and curve B of FIG. 4 shows the equivalent encoded waveform train. The successive timing or signal periods of the binary train are numbered to aid in the description. It is to be understood of course, that the duration of each mark or "1," and space, or "0," of the binary train is identical to the —cosine bit period T. For the first two time intervals, two successive "1's" are shown. During the first signal period, the encoded —cosine bit is coincident with the start of the first signal period and is that represented by vector (0) of FIG. 3 and shown at (a) in FIG. 2. The fact that the —cosine function starts at time $t_0$ supplies the encoded information that specifies that the next "1" binary bit should occur during the second signal period. The "1" binary bit shown during the second timing period in FIG. 4A is represented by vector (2) of FIG. 3 which is a —cosine signal delayed 90° as shown in FIG. 2(c). The reason for the 90° delay is that there are two "0" binary bits between the second and third "1's" (interval 5) and each "0" binary bit is represented by a delay of ⅛T or 45°. Thus, the second —cosine bit corresponding to the second "1" period contains encoded information by nature of the 90° delay from the start of the second "1" that specifiies that the next "1" should occur during the fifth signal period. Similarly, the encoded —cosine bit in the fifth, sixth, and seventh signal periods contains the information that successive "1's" should occur during the sixth, seventh and eighth signal periods, respectively. The encoded —cosine bit in the eighth signal period contains the information that the next "1" should occur during the tenth signal period. It can be seen that the encoded information identifies when the next "1" signal should occur from the time position of the previous "1" signal. Thus, the nature of the encoded —cosine bit in the second "1" period of FIG. 4A, i.e., —sin $\omega t$ (FIG. 2(c)), specifies that the next "1" should occur three signal periods later and not in the same time period, referenced from an arbitrarily chosen period on the time scale. By this arrangement, a "1" can be specified seven signal periods in advance. It is of course necessary at the transmitter to know beforehand the number of spaces between successive "1" signals. This offers no problem inasmuch as the system may operate from an input signal store as a prepared tape. With respect to the encoded "1" signal information, it is the presence only of the —cosine signal that is significant and inasmuch as the relative amplitude is not important, the binary nature of the original signal train is retained. Due to the orthogonal encoding of the "1" signal, it is possible when establishing its presence at the receiver to also determine its vector representation and thus know beforehand when the next "1" should occur. As can be seen from FIG. 4B, the encoded signal has the same numbers of signal transitions, i.e., changes from mark to space and space to mark, as the input conventional binary signal train. However, inasmuch as the transitions of the encoded signal are —cosine functions, they are less abrupt than the step functions of the conventional binary signals. Thus, the additional prediction information is accomplished without increasing the bandwidth required for signal transmission or slowing down the rate of transmission because some of the time interval normally reserved for the transmission of space signals is utilized to transmit the additional prediction information. A signal stream such as illustrated in FIG. 4B where the mark signal is a —cosine function that is encoded with additional predicting information by virtue of its time position relative to a periodic interval on the time scale is referred to as a redundant encoded monocycle signal hereinafter referred to as REM.

TRANSMITTER FOR REM SYSTEM

Figure 5:
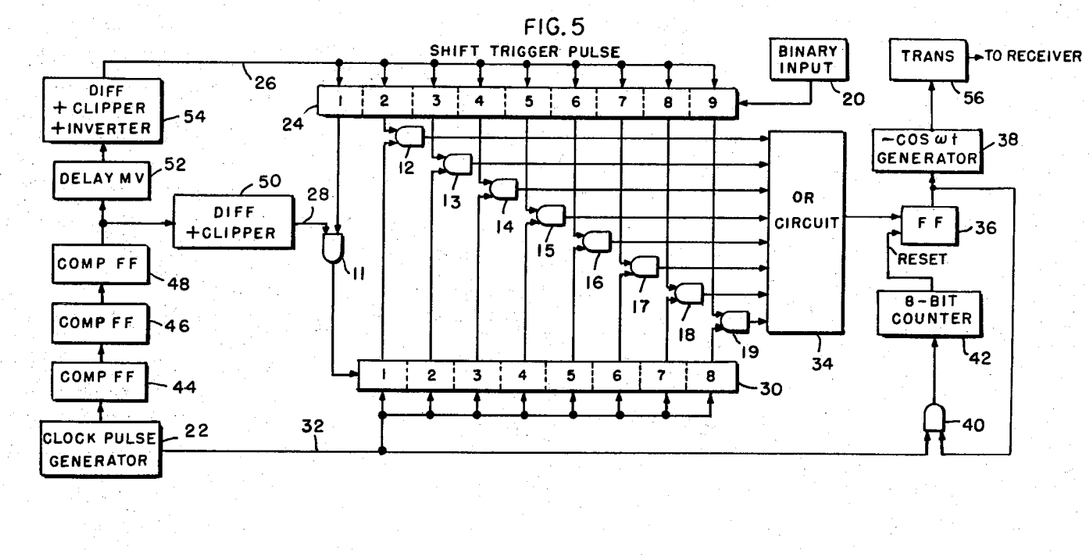
FIG. 5 is a block schematic diagram of the Redundant Encoded Monocycle encoder.

In the REM encoder of FIG. 5, the input binary signal information to be transmitted is supplied by a suitable source 20 which may, for example, comprise a standard Teletype tape reader adapted to accept eight band punched tapes. At 22 there is provided a clock pulse generator which provides a continuous series of reference clock pulses at a frequency of $8f$, where $$f = \frac{1}{T}$$

so that eight equally spaced clock pulses are produced for the duration of each "1" (mark) or "0" (space) of the input binary signal information. As explained below, all the timing pulses necessary for the operation of the REM encoder of FIG. 5 are derived from reference clock pulse generator 22. As shown, the binary signal information from source 20 is applied serially to the 9th stage of 9-bit signal storage shift register 24. The binary signal information is moved through successive stages of shift register 24 by means of a shift trigger pulse applied in parallel to the stages of register 24 through lead 26. The shift trigger pulses applied to register 24 is made to occur periodically between every seventh and eighth reference clock pulse, every eighth reference clock pulse being hereinafter referred to as the sample clock pulse corresponding to the initiation of either a "1" or a "0" in the binary information signal from input source 20. This arrangement allows for a shift in the register 24 after the seventh reference clock pulse but before the next periodic sample or eighth clock pulse occurs. The outputs of each of the 9 stages, i.e. stages 1–9 in that order, of register 24 are respectively connected to one input of a respective "AND" gate shown successively at 11, 12, 13, 14, 15, 16, 17, 18, and 19. The second input to "AND" gate 11 is a periodic trigger pulse, applied through lead 28, having a period T so that it is coincident with the recurring sample clock pulses. The respective second inputs of "AND" gates 12–19 are derived from respective stages of an 8-bit shift register 30. That is, the second input to "AND" gate 12 is derived from the number 1 stage of 8-bit shift register 30; the second input to "AND" gate 13 is derived from the number 2 stage of register 30; the second input to "AND" gate 14 is derived from the number 3 stage of register 30; the second input to "AND" gate 15 is derived from the number 4 stage of register 30; the second input to "AND" gate 16 is derived from the number 5 stage register 30; the second input to "AND" gate 17 is derived from the number 6 stage of register 30; the second input to "AND" gate 18 is derived from the number 7 stage of register 30; and the second input to "AND" gate 19 is derived from the number 8 stage of register 30. The periodic clock reference pulses derived from generator 22 are applied in parallel to the stages of register 30 as shift trigger pulses through lead 32. The output of "AND" gate 11 is applied serially to the number 1 stage of register 30 and the discrete outputs of "AND" gates 12–19 are applied as inputs to an "OR" circuit 34. As shown, the output of "OR" circuit 34 triggers a flip-flop 36, the output of which provides a gating pulse for $(1 - \cos \omega t)$ generator 38 and to an "AND" gate 40 to which is also applied the clock reference pulses from generator 22. The flip-flop 36 is reset by the output of an 8-bit counter 42 responsive to the output of "AND" gate 40 and adapted to provide a reset trigger pulse for flip-flop 36 after eight clock reference pulses have passed therethrough.

Figure 6:
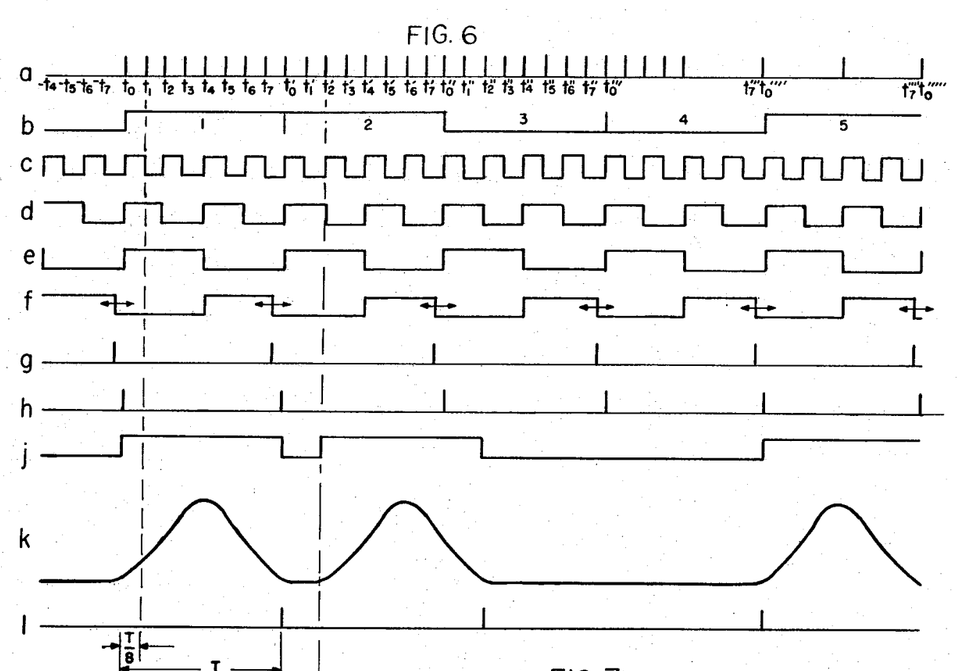
FIG. 6 shows waveforms useful in explaining the operation of the REM encoder of FIG. 5.

As hereinabove described the various timing pulses required to operate the REM encoder of FIG. 5 are derived from clock pulse generator 22 which generates a continuous series of pulses at a frequency $8f$ so that each clock or reference pulse occurs at $T/8$ seconds. These clock pulses are shown in FIG. 6a where each successive series of eight clock reference pulses is designated as $t_0-t_7$, $t_0'-t_7'$, $t_0''-t_7''$, $t_0'''-t_7'''$, etc. The $t_0$ pulses in each series are the sample clock pulses corresponding to the initiation of either a "1" or an "0" in the input binary information. Referring now again to FIG. 5, the output pulses of clock generator 22 are applied to a frequency dividing circuit comprised of three complimentary flip-flops 44, 46, 48. The output of flip-flop 48 is a series of pulses at a frequency $2f$, that is, the high output of flip-flop 48 has a duration of four clock reference pulses and the low output of flip-flop 48 also has a duration of four clock reference pulses. The outputs of flip-flops 44, 46, and 48 are shown in FIGS. 6c, 6d, and 6e, respectively. As shown, the output of flip-flop 48 is applied to a differentiating and clipping circuit 50, the output of which provides a periodic trigger pulse which coincides with every eighth or sample clock pulse at periodic times $t_0$. This trigger pulse is shown in FIG. 6h. Differentiator and clipping circuit 50 supplies the series of trigger pulses to one input of "AND" gate 11 through lead 28. The output of flip-flop 48 is also applied to a delay multivibrator 52 which is triggered in coincidence with the low output of flip-flop 48 to provide a high output pulse whose trailing edge is delayed so that it occurs between the seventh and sample or initiating clock pulse of each series of eight clock reference pulses. The duration of the full cycle of delay multivibrator 52 corresponds to eight clock reference pulses and thus coincides with the full cycle of the output from flip-flop 48. As shown, the output of delay multivibrator 52 is applied to a differentiator, clipper, and inverter circuit 54 to provide a series of trigger pulses which coincide with the delayed trailing edge of delay multivibrator 52. By this arrangement, a series of trigger pulses is supplied in the output of circuit 54 between every seventh and sample or eighth clock pulse, and these trigger pulses are applied in parallel as shift pulses to the nine stages of shift register 24 through lead 26. The output of delayed multivibrator 52 is shown in FIG. 6f and the corresponding shift trigger pulses applied to stages 1–9 of shift register 24 is shown in FIG. 6g.

The operation of the REM signal encoder of FIG. 5 will now be described in conjunction with the waveform diagrams of FIG. 4 and FIG. 6. The binary signal to be transmitted is assumed to be that shown in FIG. 4A and which is partly reproduced in FIG. 6b. Since the shift trigger pulses (FIG. 6g) applied to storage shift register 24 occurs every T seconds between each seventh $(t_7)$ and sample clock pulse $(t_0)$, the stored signal in one stage of shift register 24 will be shifted to the next successive stage for each trigger shift pulse applied through lead 26. Thus, at the end of the eighth binary input signal, the stages of shift register 24 will be in the following condition; "1's" are stored in the number 1 and number 2 stages; "0's" are stored in the number 3 and number 4 stages; "1's" are stored in the number 5, number 6, number 7 and number 8 stages; and an "0" is stored in the number 9 stage. During all this time, a series of trigger pulses (FIG. 6h) at periodic times $t_0$, i.e. sample clock reference times, is applied as one input to "AND" gate 11 from differentiator-clipper circuit 50. When a "1" appears in stage number 1 of register 24 at a time $t_0$, "AND" gate 11 will supply a "1" which is applied to the number 1 stage of shift register 30. This "1" is moved through the successive stages of shift register 30 by the application of the clock reference pulses supplied from generator 22 (FIG. 6a). Since each binary input signal has a duration T equal to eight clock reference pulses, a "1" in the number 1 stage of shift register 30 will coincide with the "1" in the number 2 stage of register 24 so that "AND" gate 12 will now supply an output pulse which is passed through "OR" circuit 34 to trip flip-flop 36. Flip-flop 36, which is of the bistable type such as an Eccles-Jordan circuit, is arranged so that it supplies a high output when triggered to ON by a pulse from "OR" circuit 34 and a low output when reset. When triggered to ON, flip-flop 36 will remain in this position regardless of additional triggers until a reset pulse is applied. The high output pulse from flip-flop 36 gates or turns ON both the $(1-\cos \omega t)$ generator 38 and the "AND" gate 40 to which is also applied the clock reference pulses from generator 22. As a result, "AND" gate 40 will allow the eight clock reference pulses $t_1$, $t_2$, $t_3$, $t_4$, $t_5$, $t_6$, $t_7$, and $t_0'$ to pass through to counter 42 and be counted. At the end of the eight count, $t_0'$, a trigger reset pulse is supplied from counter 42 to reset flip-flop 36 to its low output position thereby turning off both the $(1-\cos \omega t)$ generator 38 and "AND" gate 40. Referring now again to shift register 24, during the time interval $t_7$ to $t_0'$, the application of the shift trigger pulse through lead 26 to shift register 24 has caused the first "1" in stage number 1 of register 24 to move out of the register and to shift the "1" in the number 2 stage thereof into the number 1 stage; the "0" in the number 3 to shift into the number 2 stage; the "0" in the number 4 stage to shift into the number 3 stage, etc. Since a "1" is still in the number 1 stage, a "1" is again supplied by "AND" gate 11 to stage number 1 of shift register 30. This "1" will again be moved down shift register 30 at the clock reference pulse rate. Since the "1" previously in the number 5 stage of register 24 has shifted to the number 4 stage of register 24 as described above, a "1" in the number 3 stage of shift register 30 will coincide with the "1" in the number 4 stage of register 24 so that "AND" gate 14 will supply an output to "OR" circuit 34, the output of which will again trigger flip-flop 36 to its high output position to simultaneously turn on "AND" gate 40 and $(1-\cos \omega t)$ generator 38. However, the turn-on gate from flip-flop 36 is delayed until time $t_2'$ since it required two clock reference pulses $t_1'$ and $t_2'$ for the "1" in shift register 30 to be shifted from the number 1 stage to the number 3 stage thereof. Thus, "AND" gate 40 will allow the eight clock reference pulses $t_3'$, $t_4'$, $t_5'$, $t_6'$, $t_7'$, $t_0''$, $t_1''$, and $t_2''$ to pass through to counter 42 and be counted as previously explained. At the end of the eight count $t_2''$, a trigger reset pulse, FIG 6l is again supplied from counter 42 to reset flip-flop 36 to its low output position thereby turning off the $(1-\cos \omega t)$ generator 38, after a single cycle has elapsed, and also "AND" gate 40.

Now, during the time interval $t_7'-t_0''$, the application of a shift trigger pulse through lead 26 to shift register 24 has placed a "0" in the number 1 and 2 stages of register 24; a "1" in the number 3–6 stages of register 24; and a "0" in the number 7 stage of register 24. In this condition, no output will be derived from "AND" gate 11 to be applied as a serial input to stage number 1 of shift register 30 until time $t_0''''$, at which time a "1" will be placed in stage number 1 of shift register 24. Thus, for reference clock pulse $t_2''-t_0'''$ and $t_0'''-t_0''''$, no outputs will be derived from "AND" gate 11 and hence no "1" input is applied to shift register 30 during this time so that no output is derived from $-\cos \omega t$ generator 38 during this time. At reference clock pulse time $t_0''''$, however; a "1" is stored in the number 1 stage of shift register 24 and the sequence of operation is then the same as that hereinabove described when a "1" was stored in the number 1 stage of shift register 24. A "1" in the number 1 stage of shift register 24 will cause a single cycle $-\cos \omega t$ wave to be generated in a time position delayed in accordance to the number of "0"s or spaces in the input binary signal occurring before the appearance of the next "1" or mark signal. If a "0" is in the number 1 stage of shift register 24, no $(1-\cos \omega t)$ signal is generated. The output of flip-flop circuit 36, the output of $(1-\cos \omega t)$ generator 38 and the reset trigger pulses derived from counter 42 are shown in FIGS. 6j, 6k and 6l, respectively.

FIG. 7 shows a detailed circuit diagram of $-\cos \omega t$ generator 38. The basic generator is a conventional Wein-bridge oscillator 60 such as that shown on page 180 of the Department of the Army Technical Manual TM 11–690, "Basic Theory and Application of Transistors," U.S. Government Printing Office, 1959. Oscillator 60 has been modified so that it is normally biased to cutoff. This is accomplished by connecting emitter resistor 62 to the output of flip-flop 36 instead of to ground as is normally done for free-running operation. When flip-flop 36 is in its OFF or lower state, it applies a negative potential with respect to ground to terminal 64 thereby cutting-off operation of the oscillator. When flip-flop 36 is turned ON, the potential at terminal 64 is raised to ground to initiate oscillation of oscillator 60. The frequency of oscillator 60 is chosen so that only one cycle will occur during T seconds, which is the length of each ON pulse from flip-flop 36. Thus only a single cycle will pass before the oscillator is again biased to cutoff by the action of flip-flop 36. Since the output of a Wein-bridge oscillator is a sine wave, it is supplied through a coupling capacitor 66 to an inductor 68 and resistor 70 connected in series. The impedance of resistance 70 is small in comparison to that of inductor 68. The action of inductance 68 causes the voltage of the signal across resistor 70 to lag 90° in phase from the sine wave output of oscillator 60 to thereby produce the desired $-\cos$ waveform across resistor 70. This $-\cos$ signal is then supplied to transmitter 56 (FIG. 5) through output terminals 72 (FIG. 7). It should be noted that a single cycle of a $-\cos$ wave having a period of T seconds is generated for each ON or high level pulse from flip-flop 36 and that these $-\cos$ pulses are time-quantized to one of eight distinct positions in the 2T timing periods in accordance with the code which has been established in FIGS. 2 and 3.

REM DECODER

Figure 8A:
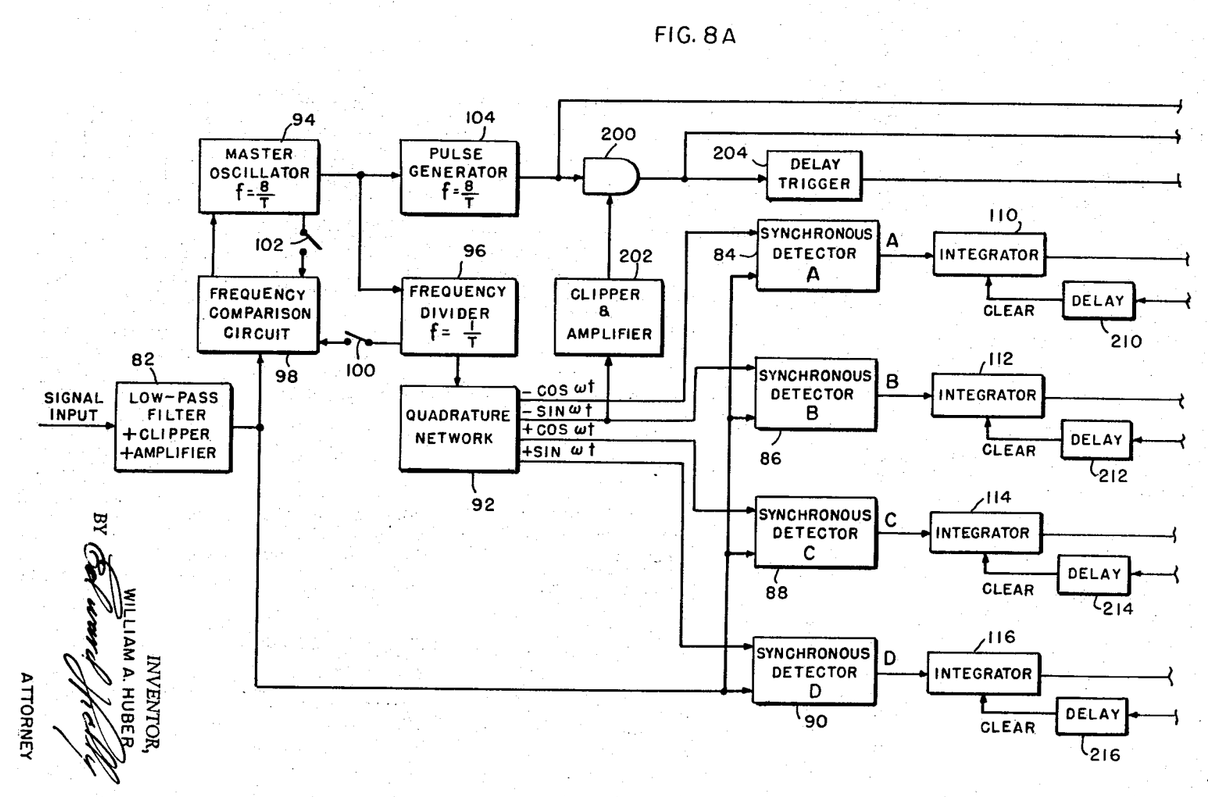
FIGS. 8A and 8B together comprise FIG. 8 which is a block diagram of an REM decoder.
Figure 8B:
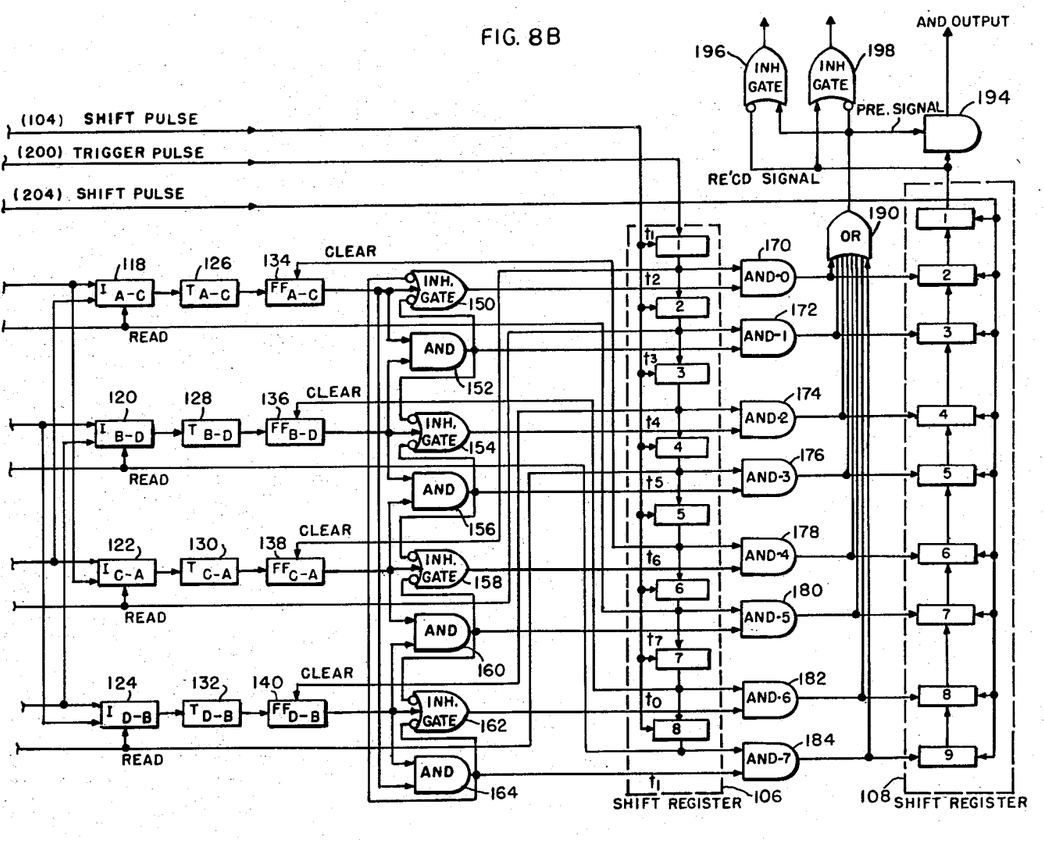
Figure 9:
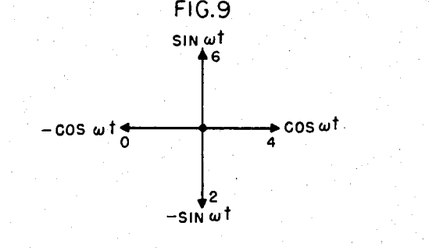
FIG. 9 is a vector diagram illustrating the quadrature reference signals in the decoder of FIG. 8.

At the receiver, the transmitted signal is decoded by the system shown in FIGS. 8A and 8B. The incoming signal stream is first passed through a low-pass filter, clipper and amplifier circuit 82. Since the nature of the REM signal stream is such that the $-\cos$ bits are rich in the fundamental frequency, and depend little on harmonics, it is possible to obtain excellent noise discrimination in the filter section of circuit 82. Thus, the function of the filter section of 82 is to restrict the band-pass to only those frequencies necessary for signal reception. The clipper section of 82 is used to restrict the range of amplification to that of the information signals only, and the amplifier section of 82 is used to supply the necessary signal gain, and, if required, may also provide correction for frequency and phase distortion. After passing through stage 82, the REM encoded signals are applied in parallel as discrete inputs to four synchronous detectors 84–90. Also respectively supplied to detectors 84–90 are four orthogonal decoding signals derived from a quadrature network generator 92. As hereinbelow explained, the output of generator 92 supplies respective continuous signal waveforms comprising a $-\cos$ wave, a $-\sin$ wave, a $+\cos$ wave and a $+\sin$ wave. With the $-\cos$ wave as the zero vector, the vector representation of the output quadrature network 92 is shown in FIG. 9. Detector 84 is supplied with the $-\cos$ signal waveform; detector 86 is supplied with the $-\sin$ signal waveform; detector 88 is supplied with the $+\cos$ signal waveform and detector 90 is supplied with the $+\sin$ signal waveform.

The orthogonal decoding reference signals derived from generator 92 are at the same radian frequency $\omega = 2\pi f$, where $$f = \frac{1}{T}$$

as is the frequency of the incoming signal to be encoded. A master oscillator or clock circuit 94 is provided to produce a sine wave output frequency of $8/T$, the output of which is divided by 8 in frequency divider circuit 96 to produce a sine wave signal output at $$f = \frac{1}{T}$$

The signal output $$f = \frac{1}{T}$$

of divider circuit 96 is thus at a frequency equal to that of the incoming signal. As shown, this signal $$f = \frac{1}{T}$$

which is a sine wave in form, is applied to the quadrature network generator 92 whose output produces the orthogonal continuous wave signals applied to the respective synchronous detectors 84–90. In order to provide proper operation of the decoder, a suitable system must be provided to assure that, at the start of transmission, the output of master oscillator 94 is properly synchronized both in frequency and phase with the encoder clock frequency from source 22 (FIG. 5), and that the proper phase relationship is maintained at each of the synchronous detectors 84–90. This condition requires that the output of frequency divider circuit 96, which is derived from master oscillator 94, be phase-locked to a fixed position with respect to the zero vector ($-\cos \omega t$) transmitter signal. This is accomplished at the start of a signal message by transmitting a continuous series of mark or "1" signals. These signals are passed through low-pass filter, clipper and amplifier circuit 82 and applied as one input to frequency comparison circuit 98, the other input to frequency comparison circuit 98 being supplied from divider circuit 96 through a suitable switch 100. The input to comparison circuit 98 from amplifier circuit 82 is shaped into a rectangular pulse of time duration less than $T/32$. Any discrepancy between the frequency of the incoming "1" signals and that supplied by frequency divider circuit 96 generates an error voltage in the output of comparison circuit 98 which is supplied to control the frequency output of master oscillator 94. When the proper frequency and phase conditions prevail, the output from divider circuit 96 is removed as one input to comparison circuit 98 by opening switch 100, and the output of master oscillator 94 is then substituted therefor by means of a suitable switch 102. With switch 102 closed and switch 100 open, the frequency and phase stability are then maintained from the input signal information in the conventional manner. Of course, when a master oscillator 94 with sufficient long time frequency and phase stability is used, the frequency comparison circuit 98 may be disconnected so that synchronization is maintained by virtue of the inherent stability of master oscillator 94. As shown, master oscillator 94 supplies the input to a pulse generator 104 which supplies a stream of clock pulses having a frequency $$f = \frac{8}{T}$$

As hereinbelow described, the stream of clock pulses derived from pulse generator 104 supply discrete shift pulses for an eight-stage shift register 106 and a nine-stage output signal shift register 108.

The four synchronous detectors 84–90 are of the product demodulator type well known in the art and may constitute four pentodes. The respective quadrature signals from network 92 are applied to respective suppressor grids of the pentodes while the information signals from circuit 82 are applied in parallel to all the pentode control grids. By such an arrangement, the output of each synchronous detector is the product of its respective input signals as is well known in the art. The respective synchronous detectors 84–90 are so negatively biased that the resulting signal output is only present at a respective detector if the input REM signal and the reference quadrature signal are in phase during the positive time of the reference signal. The REM signal amplitude is not critical since it is only necessary to establish a signal presence, and no frequency correlation is necessary since the signals involved are all at a single frequency. The bias on the synchronous detectors 84–90 is so arranged that signals are detected at the respective outputs thereof only when the referenced signal and the incoming REM signal are $0°$ and $\pm 45°$ in phase. Thus, if the incoming REM signal is encoded $-\cos \omega t$, it will correlate positively with only the local $-\cos \omega t$ signal in synchronous detector 84. The other locally generated quadrature reference signals are either in quadrature, and therefore will not affect correlation, or in the case of the $+\cos \omega t$ signal will produce negative correlation and can be cut off in the synchronous detector 84 due to biasing. If the incoming REM signal bit is encoded $-\cos \omega t - \sin \omega t$, it will then produce two correlation components; one with the local $-\cos \omega t$ signal in synchronous detector 84 and one with the $-\sin \omega t$ in the synchronous detector 86. Similar reasoning can be applied to the other six encoded positions to show that REM signals encoded $-\sin \omega t$, $\cos \omega t$, and $\sin \omega t$ will correlate in detectors 86, 88 and 90, respectively, and that REM signals encoded $-\sin \omega t + \cos \omega t$, $\cos \omega t + \sin \omega t$, and $\sin \omega t - \cos \omega t$ will correlate in detectors 86 and 88, 88 and 90, and 84 and 90, respectively. For convenience in describing the remainder of the receiver circuit, the outputs of detectors 84–90 will be designated as channels A, B, C, and D, respectively.

It will be noted that the maximum output signal from a channel will result only when there is exact correlation between the reference quadrature signal and the incoming REM signal. That is, when an incoming REM pulse signal is encoded so that it correlates exactly with one of the four local signals in one of the detectors 84–90, the output of that detector is a pulse of unity voltage. Now, if an incoming REM pulse is encoded in one of the other four positions, i.e., $-\cos \omega t - \sin \omega t$, $\cos \omega t - \sin \omega t$, $\cos \omega t + \sin \omega t$ or $\sin \omega t - \cos \omega t$, it will correlate in two detectors as hereinabove described. However, since the correlation is not exact, the output pulses from each detector are approximately 0.70 of unity. This operation is inherent with the type of sychronous detector discussed above. It should be noted that for both the above situations, the remaining two or three detectors, as the case may be, may also have output pulses, but they will be of a magnitude considerably below the above mentioned 0.70 level. Therefore, a threshold control is required to permit the output response of the desired synchronous detector channel to be passed and still prevent the passing of the response from the remaining undesired channels. It is preferred that the signal reduction in the undesired channel be achieved such that a relative large amount of noise could be tolerated in the undesired channels before a false output would be obtained therefrom. This system will now be described.

Figure 10:
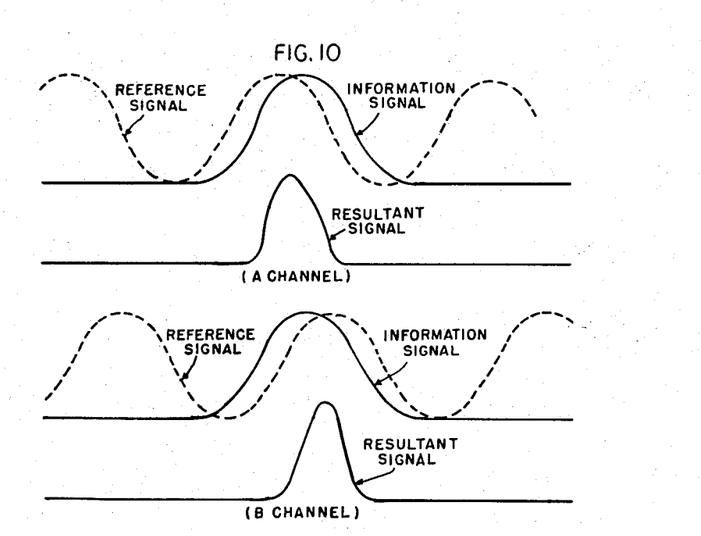
FIG. 10 is a waveform diagram useful in explaining the operation of the synchronous detectors shown in FIG. 8.

The respective synchronous detector outputs in channels A, B, C, and D are applied to respective integrator circuits 110–116, the outputs of which are combined in accordance with the following logic. The integrated output of channel C integrator 114 is subtracted from the integrated output of channel A integrator 110 in difference circuit 118. The integral difference is obtained by inverting the output from the C channel integrator 114 and adding it to the output of A channel integrator 110. Similarly, the output of D channel integrator 116 is subtracted from the output of B channel integrator 112 in difference circuit 120; the output of A channel integrator 110 is subtracted from the output of C channel integrator 114 in difference circuit 122; and the output of B channel integrator 112 is subtracted from the output of D channel integrator 116 in difference circuit 124. As shown, the respective outputs of difference circuits 118–124 are applied to respective threshold gates 126–132, the respective outputs of which, in turn, are applied as inputs to respective flip-flop circuits 134–140. With such an arrangement, a signal from channel A will be applied to its associated flip-flop 134 only if the signal derived at the output of its associated integral difference circuit 118 is of an amplitude to pass through channel A threshold gate 126. Similarly, a signal from channel B will be applied to its associated flip-flop 136 only if the signal derived at the output of its associated integral difference circuit 120 is of an amplitude to pass through channel B threshold gate 128; a signal from channel C will be applied to its associated flip-flop 138 only if the signal derived at the output of its associated integral difference circuit 122 is of an amplitude to pass through channel C threshold gate 130; and a signal from channel D will be applied to its associated flip-flop 140 only if the signal derived at the output of its associated integral difference circuit 124 is of an amplitude to pass through channel D threshold gate 132. As described above, the threshold gates 126–132 are D.-C. biased to cut off all signals falling below the 0.7 level. As an indication of the operation of the threshold circuit, assume an encoded incoming signal in the No. 1 vector of FIG. 3, i.e. the $-\cos \omega t - \sin \omega t$ signal pulse. As described above, an output will be obtained from the A channel synchronous detector 84 and the B channel synchronous detector 86, but no signal will appear at the outputs of C and D channel synchronous detectors 88 and 90. The signal state at the output of the synchonous detectors 84 and 86 is shown in FIG. 10. Thus, for the $-\cos \omega t - \sin \omega t$ input signal, an output will be derived from threshold gates 126 and 128 so that flip-flops 134 and 136 will be set in an arbitrarily identified high-output level position. With the above explanation in mind the input signals will set the flip-flops 134–140 to the arbitrarily identified high-output level position in accordance with the following logic.

Table I

| Input signal vector (FIG. 3): | Flip-flop set to high-output level |
|---|---|
| (0) $-\cos \omega t$ | 134 |
| (1) $-\cos \omega t - \sin \omega t$ | 134 and 136 |
| (2) $-\sin \omega t$ | 136 |
| (3) $+\cos \omega t - \sin \omega t$ | 136 and 138 |
| (4) $+\cos \omega t$ | 138 |
| (5) $+\cos \omega t + \sin \omega t$ | 138 and 140 |
| (6) $+\sin \omega t$ | 140 |
| (7) $-\cos \omega t + \sin \omega t$ | 140 and 134 |

As will be explained hereinbelow, the flip-flops 134–140 are set by supplying respective "clear" pulses and the integral difference circuits 118–124 are read by respective "read" pulses.

Referring again to FIG. 8, a series of alternating INHIBIT and AND gates 150–164 are connected to the outputs of flip-flops 134–140 in the following manner. The input to AND gate 152 is supplied by flip-flops 134 and 136; the inputs to AND gate 156 is supplied by flip-flops 136 and 138; the input to AND gate 160 is supplied by flip-flops 138 and 140; and the input to AND gate 164 is supplied by flip-flops 134 and 140. The input to INHIBIT gate 150 is supplied to flip-flop 134 and the outputs of AND gates 152 and 164. Similarly, the input to INHIBIT gate 154 is supplied by flip-flop 136 and the outputs of AND gates 152 and 156; the input to INHIBIT gate 158 is supplied by the outputs of AND gates 156 and 160 and flip-flop 138; and the input to INHIBIT gate 162 is supplied by the outputs of AND gates 160 and 164 and flip-flop 140. The INHIBIT gates 150–162 will supply signal outputs only when the signal input thereto is provided by an associated flip-flop, and no signals are supplied to either or both of the remaining inputs of respective INHIBIT gates. For example, INHIBIT gate 150 will only produce an output signal, or a "1," when there is a high level output from flip-flop 134, and no signals are applied to INHIBIT gate 150 by either AND gate 164 or AND gate 152. Signals from AND gate 164 or AND gate 152, or both, will preclude or inhibit an output from INHIBIT gate 150. The remaining INHIBIT gates 152–162 operate in a similar manner.

A series of eight AND gates 170–184 is provided between the stages of shift reigsters 106 and 108 and are connected in the following manner. The two inputs to AND-0 gate 170 are supplied from INHIBIT gate 150 and the output of stage 1 of shift register 106. Similiarly, the two inputs to AND-1 gate 172 are supplied from AND gate 152 and stage 2 of register 106; the two inputs to AND-2 gate 174 are supplied by INHIBIT gate 154 and stage 3 of shift register 106; the two inputs to AND-3 gate 176 are supplied by AND gate 156 and stage 4 of register 106; the two inputs to AND-4 gate 178 are supplied from INHIBIT gate 158 and stage 5 of register 106; the two inputs to AND-5 gate 180 are supplied by AND gate 160 and stage 6 of register 106; the two inputs to AND-6 gate 182 are supplied by INHIBIT gate 162 and stage 7 of register 106; and the inputs to AND-7 gate 184 are supplied by AND gate 164 and stage 8 of register 106. The respective outputs of AND gates 170–184 are combined in an OR circuit 190 and are simultaneously applied to respective stages of output shift register 108 beginning with stage 2 of shift register 108. Thus the discrete outputs of AND gates 170–184 are supplied respectively as inputs to stages 2, 3, 4, 5, 6, 7, 8 and 9 of output shift register 108. The output of stage 1 of shift register 108 is supplied as one input to AND output gate 194 and also as one input to output INHIBIT gates 196 and 198. A second input is supplied to AND output gate 194, INHIBIT gate 196, and INHIBIT gate 198 by the output of the OR gate 190. The significance of the outputs derived from AND output gate 194, and both output INHIBIT gates 196 and 198 will more readily be understood in connection with the operation of the logic circuits of the receiver as hereinbelow described.

The reset or "clear" pulses for flip-flops 134, 136, 138 and 140 are supplied from the outputs of stages 5, 7, 1, 3, respectively, of shift register 106. The "read" trigger and "clear" trigger pulses for A channel integrator 110 and A channel integral difference circuit 118 is supplied by stage 6 or shift register 106, with the "clear" trigger pulses being supplied through a delay circuit 210. The significance of the delay circuit 210 will more readily be understood in connection with the operation of the logic circuit hereinbelow described. Similarly, the "read" trigger and "clear" trigger pulses for B channel integrator 112 and integral difference circuit 120 is supplied by stage 8 of register 106 and delay circuit 212; the "read" trigger and "clear" trigger pulses for C channel integrator 114 and integral difference circuit 122 are supplied by stage 2 of shift register 106 and delay circuit 214, and the "read" trigger and "clear" trigger pulses for D channel integrator 116 and integral difference circuit 124 are supplied by stage 4 of shift register 106 and delay circuit 216.

As shown, the output $$f = \frac{8}{T}$$

from pulse generator 104 is applied in parallel to each of the eight stages in shift register 106 and is thus utilized as shift pulses to shift an interrogation signal through register 106. The initiating trigger for register 106 is supplied by the output of AND gate 200 which is supplied with two inputs. One input comprises the stream of pulses from pulse generator 104 and the other input to AND gate 200 comprises the positive output of the quadrature reference signal $-\sin \omega t$ which is also applied to B channel synchronous detector 86. The positive output $-\sin \omega t$ signals are supplied by a clipper and amplifier circuit 202 which is responsive to the quadrature reference signal $-\sin \omega t$ to provide negative clipping so that only the positive portions of the $-\sin \omega t$ signals are applied as an input to AND gate 200. The output of AND gate 200 is also applied as a shift pulse to the nine stages of output shift register 108 through delay trigger circuit 204 which provides a delay not greater than the duration between two successive $$f = \frac{8}{T}$$

pulses from generator 104.

Figure 11:
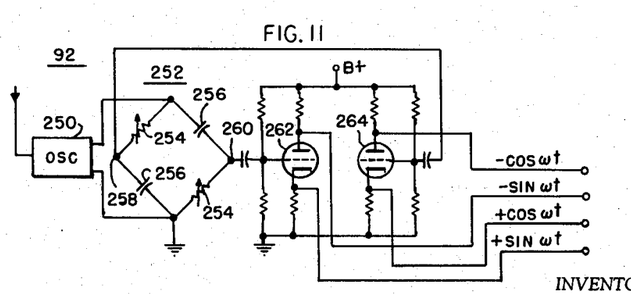
FIG. 11 is a detailed circuit diagram of the quadrature reference signal generator of FIG. 8.

FIG. 11 shows a detailed circuit diagram of a preferred embodiment of signal generator 92. A suitable stable oscillator 250 which may be a transistor Wein-bridge oscillator, supplies a sine wave signal to the input terminals of a bridge circuit 252 having variable resistors 254 in two opposing arms and capacitors 256 in the other two opposing arms. Resistors 254 are then adjusted until the signals appearing at the output terminals 258 and 260 are 90° out-of-phase. These output signals are then supplied to the grids of a pair of balanced triodes 262 and 264. As is well known, the signals appearing at the cathodes of triodes 262 and 264 will be in phase with the input signals applied to the grids, and the signals appearing at the anodes of tubes 262 and 264 will be 180° out-of-phase with the respective cathode signals. Since the input grid signals are 90° out-of-phase, outputs taken from the anodes and cathodes of tubes 262 and 264 will give the four orthogonal decoding signals which are supplied to synchronous detectors 84–90. The circuit shown in FIG. 11 is but one of several conventional phase-splitting circuits which may be employed to provide the locally generated decoding signals.

Figure 12:
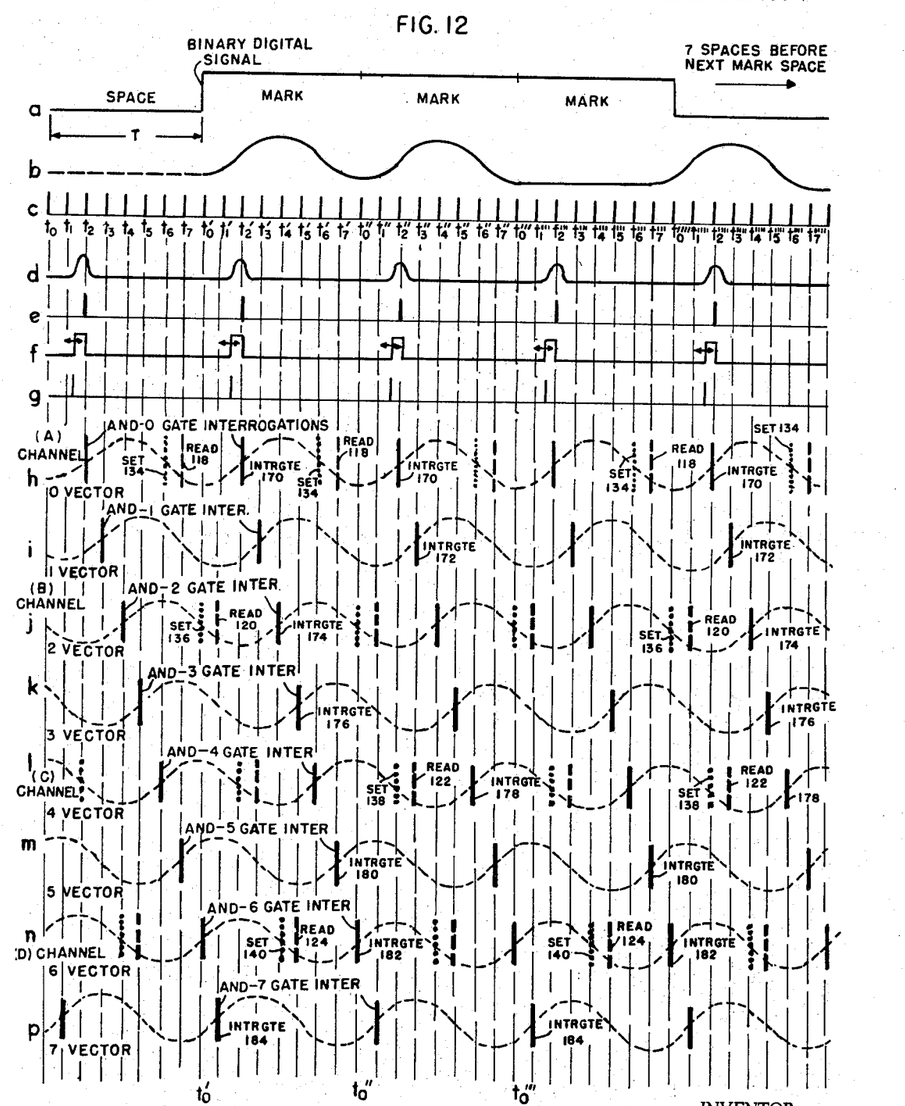
FIG. 12 shows waveforms useful in explaining the operation of the REM decoder of FIG. 8.

The operation of the REM signal receiver or decoder shown in FIGS. 8A and 8B will be discussed generally in conjunction with FIG. 9 and the waveforms shown in FIG. 12. Referring to FIG. 12, it will be assumed that the input information to be detected is that shown in 12a. This signal condition represents the transmission of three successive binary mark signals followed by seven spaces before the transmission of the next mark signal. The latter mark signal is not shown in 12a but its prediction is given by the ⅞ T delay in the generation of the third $-\cos \omega t$ bit shown in the encoded signal 12b. It is to be assumed of course that the receiver has been properly synchronized as hereinabove described. The waveform of 12c illustrates the pulse stream output of pulse generator 104 at a frequency $$f = \frac{8}{T}$$

and which are applied as shift pulses to the stages of register 106. As in the transmitter, each series of eight pulses is designated as $t_0$–$t_7$, $t_0'$–$t_7'$, $t_0''$–$t_7''$, $t_0'''$–$t_7'''$, etc., so that for each T duration, eight pulses are derived from generator 104. The waveform of 12d is the output from clipper and amplifier circuit 202 to which is applied the $-\sin \omega t$ signal from quadrature network 92 and which is also the reference signal applied to B channel synchronous detector 86. Since the reference $-\sin \omega t$ signal represents a 90° phase shift with respect to the zero vector or $-\cos \omega t$ reference signal, a positive output will be periodically applied from amplifier 202 to AND gate 200 at every second pulse, $t_2$, of each eight series of pulses supplied by generator 104. Thus, an output pulse will be gated from AND gate 200 and supplied as periodic initiating trigger pulses for register 106 at times $t_2$, $t_2'$, $t_2''$, etc. This waveform pulse is shown in FIG. 12e. Waveform 12f shows the delay produced by delay trigger circuit 204 and waveform 12g shows the trigger pulse output applied as a shift pulse to output shift register 108. It is to be noted that the shift trigger pulse applied to register 108 is made to occur periodically every T period slighlty before the occurrence of the respective $t_2$ pulses in each T period. The waveform shown in FIG. 12g is used to shift the information signal through output register 108. Waveforms 12h through 12p are for descriptive purposes only and indicate the relative phase positions of all possible eight encoded signal vectors which may be received in respective channels. Waveforms 12h, 12j, 12l, and 12n represent the respective reference vectors 0, 2, 4 and 6 shown in FIG. 9 which are supplied from quadrature network 92. The solid vertical line indicates the time period that one of the AND gate series 170–184 is interrogated by shift register 106. Thus AND-0 gate 170 is always interrogated at time $t_2$ of each eight pulse period T; AND-1 gate 172 is always interrogated at time $t_3$ of each eight pulse period T; AND-2 gate 174 is always interrogated at time $t_4$, etc. The dashed vertical line indicates the time period that the integral difference circuits 118–124 are read and cleared and the dotted vertical line indicates the time period that the respective flip-flops 134–140 are reset. The logic can be explained by reference to Table I. As shown in FIG. 8, and hereinbelow described, the outputs of flip-flops 134–140 are connected through AND gates 152–164 and through INHIBIT gates 150–162 to a respective one of the series of AND gates 170–184. Now, referring to Table I, it can be seen that when a $-\cos \omega t$ signal is transmitted, only flip-flop 134 will be set to the high-output level position. Because this is the only flip-flop that is in this position, its associated INHIBIT gate 150 will pass a pulse so that a signal will be stored in AND-0 gate 170. When AND-0 gate 170 is interrogated, a signal will be placed in stage 2 of output register 108. If a $$-\cos \omega t - \sin \omega t$$

signal (No. 1 vector) is transmitted, then both flip-flops 134 and 136 will be placed in the high-output level position so that AND gate 152 will provide a pulse which is stored in AND-1 gate 172 and no signals are passed through associated INHIBIT gates 150 or 154 as described above. When AND-1 gate 172 is interrogated, a signal will be placed in stage 3 of output register 108. In a like fashion, signal vectors No. 2 through No. 7 are read into their respective output shift register positions. Waveform 12g moves the signal sequentially through shift register 108 to AND output gate 194 where it is compared for redundant information. For purposes of clarity, AND-0 gate 170 and AND-1 gate 172 may be said to be associated with the A-channel; AND-2 gate 174 and AND-3 gate 176 may be said to be associated with the B-channel; AND-4 gate 178 and AND-5 gate 180 may be said to be associated with the C channel; and AND-6 gate 182 and AND-7 gate 184 may be said to be associated with the D-channel.

Considering now the input signal shown in FIG. 12a, it may be seen that just prior to $t_0'$, all the flip-flops 134–140 are in the low-output level position. That is, since no signal is "read" out of integrator difference circuit 118 at time $t_7$, A-channel flip-flop 134 will remain at the low-output level position set at time $t_6$, which pulse is derived from stage 6 of shift register 106. At time $t_2'$, therefore, no signal will be read out of AND-0 gate 170. For the same reasons, no signals will be read out of AND-1 gate 172 through AND-7 gate 184 for the timing period $t_0'$–$t_7'$ which is the duration T of the first input transmitted signal. At time $t_0''$ D-channel AND-6 gate 182 is interrogated but no output signal is obtained. This is the result of the following sequence of events. Flip-flop 140 is set to the low position at time $t_4'$. At time $t_5'$ when integrator difference circuit 124 is read, no signal will be obtained because the $-\cos \omega t$ bit was blocked due to the synchronous detector 90 being negatively biased during the active period of signal reception as hereinabove described. Now at time $t_2''$, A-channel AND-0 gate 170 is again interrogated. This time there will be an output response from AND-0 gate 170 because flip-flop 134 will have been set in the high-output level position by the output of A-channel synchronous detector 84. This is so because the presence of the information $-\cos \omega t$ signal bit caused a signal to be read out of integrator difference circuit 118 at time $t_7'$. The output of AND-0 gate 170 places a "1" in stage 2 of output shift register 108. Between interval $t_1'''$–$t_2'''$, trigger shift pulse of waveform 12g moves the "1" from the stage 2 of shift register 108 through stage 1 thereof to output AND gate 194 where it will be compared with the signal predicted to be received during the next T signaling period $t_0''$–$t_0'''$. From waveform 12d it will be seen that the second information signal —cos ωt bit will be placed in stage 2 of the shift register 108 at interrogation time $t_2'''$. The reception of the second signal bit will then be verified by the output of AND gate 194 where the current signal is matched with the previously received signal that has been stored in the output shift register 108.

Referring again to the REM signal receiver of FIG. 8, it will be noted that there are three different outputs, two of which are derived from respective output INHIBIT gate circuits 196 and 198 and the other is derived from output AND gate 194. An output from AND gate 194 indicates that the received signal has been predicted and verified. Under normal operating conditions the useful information is obtained from the output of AND gate 194. However, when a signal has been predicted, i.e. a "1" out of shift register 108, but not verified (received), i.e. an "0" out of OR gate 190, a signal will be obtained from the output of INHIBIT gate 198. Thus INHIBIT gate 198 will produce an output signal only when a "1" is derived from the output of shift register 108 and a "0," that is a low level pulse, is derived from OR gate 190. For all other conditions the output of INHIBIT circuit 198 will be "0." If a signal is received that has not been predicted, a signal will be obtained from output INHIBIT gate 196. Thus INHIBIT gate 196 will only produce an output signal when a "1" is derived from OR gate 190 and a "0" is at the output of shift register 108. For all other conditions the output of INHIBIT gate 196 will be a "0."

The above described signal matching technique allows the redundancy encoded in the transmitted signal to be recovered at the receiver. This in effect adds to the reliability of the signals inasmuch as they are verified at two different time periods. This added information is provided without sacrificing signaling speed or increasing the bandwidth beyond that previously required. The REM system provides redundancy beyond just the two signal bit comparisons due to the sequential nature of the encoding. This can be shown by the following example: The $k$th bit will contain prediction information regarding the $l$th bit. When the $l$th bit is received as predicted its reliability will be strengthened due to both a positive prediction from the $k$th bit and confirming reception. Now, the $l$th bit will also contain prediction information regarding the $m$th bit so when the $m$th bit is correctly received and verified it will further increase the reliability of the correctness of the $l$th bit because of its confirming prediction information. Likewise, when the $n$th bit is correctly received, the $m$th bit will have been established from three different sources each occurring at different times namely, (1) prediction information from previous bit, (2) actual reception of bit as predicted, and (3) subsequent confirmation of the correctness of the bit's prediction information by the correct reception of the predicted bit. This type of encoded redundancy forms a continuous link where each signal is being both continuously verified by predicted information while additionally confirmed in retrospect when its prediction information is verified. The chain redundancy inherent in the REM system can be used to strengthen the probability of making a correct decision when a predicted signal is not directly verified. To illustrate this capability it will be assumed that an 8-unit code is being transmitted that always contains at least one mark so it is known that here will never be more than seven successive spaces in the serially received code stream. The Fieldata code has this type of characteristic.

*Example 1.*—Signal is predicted but not received within an 8-unit block. Signal is received with correct prediction information during the next 8-unit block. It is known due to code structure that no more than eight successive spaces will occur and also, that the signal making the prediction was established and confirmed. Therefore, indications are that signal fall-out occurred so that the prediction information should be used to establish the missing bit.

*Example 2.*—A signal is predicted but does not occur although the criteria of at least one bit per 8-code units is satisfied. The signal that made the prediction had been predicted and verified. It is also assumed that the signal after the missing predicted signal contained prediction information that is verified. For these conditions there is good probability that a signal fall-out had occurred and a signal should be indicated in accordance with the predicted information.

*Example 3.*—A signal appears where predicted but an additional signal is also received before the time of the predicted signal. The signal was not predicted so this indicates that it is probably an error. Also, there is an 8 to 1 probability that the false signal will not contain prediction information that will coincide with the occurrence of the next true signal. This false signal is established as incorrect from two different sources and should be ignored.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. An encoder for a binary digital pulse code comprising a binary signal source for producing 1 and 0 bits of uniform duration,
   means for generating a periodic waveform,
   means responsive to said digital code for producing discrete single cycles of said periodic waveform for each 1-bit of said digital pulse code, said single cycles having the same period as the bits in said code, and means in circuit with said single cycle producing means for adjusting the time spacing between successive single periodic waveform cycles such that the spacing therebetween is a function of the duration between successive 1-bits of said digital pulse code,
   said single cycle time spacings being a prescribed fraction of said period.

2. The encoder in accordance with claim 1 wherein the time spacings between said periodic waveforms are multiples of ⅛ T seconds, where T seconds is the duration of the code bits and said cycles.

3. The system in accordance with claim 1 wherein each of said periodic waveforms is a minus cosine waveform.

4. An encoder for a binary digital pulse code comprising a binary signal source for producing 1 and 0 bits of T seconds,
   a periodic waveform generator,
   a source of clock pulses,
   means responsive to said clock pulses and said digital code for producing discrete single cycles of said periodic waveform for each 1-bit of said digital pulse code, said single cycles each having the same period as said bits, and means in circuit with said single cycle producing means for adjusting the time spacing between successive single periodic waveform cycles such that the time spacing therebetween is a function of the duration between successive 1-bits of said digital pulse code,
   said single cycle time spacings being a prescribed fraction of said period.

5. The system in accordance with claim 4 wherein said clock pulses occur at intervals of ⅛ T seconds and the time spacings between said periodic waveforms are multiples of ⅛ T seconds.

6. An encoder for a binary digital pulse code comprising a binary signal source for producing 1 and 0 bits of T seconds,
   means for generating a stream of clock pulses at intervals of ⅛ T seconds, means for periodically generating a stream of trigger pulses at T second intervals coinciding with every eighth clock pulse, means for periodically generating a stream of trigger shift pulses at T second intervals and occuring cyclically intermediate every seventh and eighth clock pulse, a nine-stage shift register serially responsive to the input binary signals and said trigger shift pulses, an eight-stage shift register responsive to the output of the stages of said nine-shift register and said clock pulses, said clock pulses constituting the shift pulses, a periodic waveform generator, and means responsive to the combined outputs of respective stages of said shift registers for producing discrete single cycles of said periodic waveform for each 1-bit of said digital pulse code, said single cycles each having the same period as said bits, and means responsive to the output of said single cycle producing means for adjusting the time spacing between successive single periodic waveform cycles such that the time spacing therebetween is a function of the duration between successive 1-bits of said digital pulse code.

7. The encoder in accordance with claim 6 wherein the time spacings between said periodic waveforms are multiples of ⅛ T seconds.

8. An encoder for a binary digital pulse code comprising a binary signal source for producing 1 and 0 bits of T seconds, means for generating a stream of clock pulses at intervals of ⅛ T seconds, means for periodically generating a stream of trigger pulses at T second intervals coinciding with every eighth clock pulse, means for periodically generating a stream of trigger shift pulses at T second intervals and occurring cyclically intermediate every seventh and eighth clock pulse, a nine-stage shift register serially responsive to the input binary signals and said trigger shift pulses, an eight-stage shift register, nine AND gates, one of said AND gates being responsive to the output of the first stage of said nine-stage shift register and said trigger pulses and having its output serially applied to said eight-stage shift register, said clock pulses being applied as shift pulses to said eight-stage shift register, the eight remaining AND gates being respectively responsive to the respective outputs of the eight successive stages of said nine-stage shift register, and the respective outputs of the eight stages of said eight-shift register, an OR gate responsive to the discrete outputs of the eight remaining AND gates, a periodic waveform generator, means responsive to the output of said OR gate and said clock pulses for producing discrete single cycles of said periodic waveform for each 1-bit of said digital pulse code, said single cycles each having a duration of T seconds, and means responsive to said single cycle producing means for adjusting the time spacing between successive single periodic waveform cycles such that the time spacing therebetween is a function of the duration between successive 1-bits of said digital pulse code, said single code time spacing being a multiple of ⅛ T seconds.

9. The system in accordance with claim 8 wherein said periodic waveform generator is a minus cosine waveform generator.

10. The system in accordance with claim 8 wherein said last mentioned means comprises a flip-flop having its output in circuit with said periodic waveform generator and responsive to the output of said OR gate for gating ON said periodic waveform generator, and a counter responsive to said clock pulses for controlling the duration of the ON gating period of said periodic waveform generator.

11. A pulse code modulator system for conveying intelligence derived from a binary dgital pulse code comprising a binary signal source for producing 1 and 0 bits of uniform duration, means for generating a periodic waveform, means responsive to said digital code for producing discrete single cycles of said periodic waveform for each 1-bit of said digital pulse code, said single cycles having the same period as the bits in said code, and means in circuit with said single cycle producing means for adjusting the time spacing between successive periodic waveform cycles such that the spacing therebetween is a function of the duration between successive 1-bits of said digital pulse code, said single cycle time spacings being fractions of said period, and decoding means responsive to the time spaced single cycles of said periodic waveform for reproducing the time sequence of occurrence of the 1-bits of said digital code.

12. A decoder for reproducing the sequence of occurrence of the 1-bits in a binary digital code comprising a source of signals encoded in the form of single cycles of minus cosine periodic waveform wherein the time spacing between successive cycles is a function of the duration between successive 1-bits of said digital pulse code, each of the bits of said code having a period of T seconds and said time spacing being fractions of said period, means for generating pulses at a rate of 8/T seconds, means for generating pulses at a rate of T seconds, a quadrature signal generator for producing a plurality of orthogonal sine-wave signals having the same frequency as the cycles of said minus cosine waveform, four synchronous detectors, each respectively responsive to one of said orthogonal signals and one of said minus cosine periodic waveforms, said detectors having an output when said input signals correlate therein, a respective integrator in circuit with each of the outputs of said detectors, a first difference circuit for producing the integral difference signal between the outputs of the first and third integrators, a second difference circuit for producing the integral difference signal between the outputs of the second and fourth integrators, a third difference circuit for producing the integral difference signal between the outputs of the third and first integrators, a fourth difference circuit for producing the integral difference signal between the outputs of the fourth and second integrators, a respective threshold circuit responsive to the respective outputs of said integral difference circuits, respective gating circuits responsive to the respective outputs of said threshold circuits, a first and second shift register, said 8/T seconds being supplied as a shift pulse to said first shift register and said T second pulses being supplied as a trigger pulse to said first shift register and as a shift pulse to said second shift register, and logic circuit means in circuit with said gating means and said first and second shift registers for indicating the presence or absence of the 1-bits of said digital pulse code in accordance with the time spacing between said single cycles.

13. The system in accordance with claim 12 wherein said logic circuit means comprises first, second, third and fourth AND gates, first, second, third and fourth INHIBIT gates, said first AND gate being responsive to the output of the first and second gating circuits and having its output supplied as an inhibit pulse to the first and second of said INHIBIT gates, said second AND gate being responsive to the output of the second and third gating circuits and having its output supplied as an inhibit pulse to the second and third of said INHIBIT gates, said third AND gate being responsive to the output of the third and fourth gating circuits and having its output supplied as an inhibit pulse to the third and fourth INHIBIT gates, said fourth AND gate being responsive to the output of the first and fourth gating circuits and having its output supplied as an inhibit pulse to the fourth and first INHIBIT gates, the output of the first, second, and third and fourth gating circuits being applied respectively to said first, second, third and fourth INHIBIT gates, a plurality of AND gates successively interrogated by the discrete outputs of the stages of said first shift register and responsive to a different one of said INHIBIT gates, the discrete outputs of said plurality of AND gates being successively applied to the second and following stages of said second shift register, and an OR gate responsive to the discrete outputs of said plurality of AND gates.

References Cited

UNITED STATES PATENTS

| | | | |
|---|---|---|---|
| 3,208,049 | 9/1965 | Doty et al. | 340—172.5 |
| 3,209,259 | 9/1965 | Huber | 325—38 |

MALCOLM A. MORRISON, *Primary Examiner.*

M. P. HARTMAN, *Examiner.*